US010975214B2

(12) United States Patent
Degenhart et al.

(10) Patent No.: US 10,975,214 B2
(45) Date of Patent: Apr. 13, 2021

(54) POLYPROPYLENE COMPOSITION

(71) Applicant: SABIC GLOBAL TECHNOLOGIES B.V., Bergen op Zoom (NL)

(72) Inventors: Peter Degenhart, Geleen (NL); Sarah Van Mierloo, Geleen (NL); Fahimi Zahra, Geleen (NL); Martin Antonius Van Es, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 62 days.

(21) Appl. No.: 16/324,138

(22) PCT Filed: Jul. 13, 2017

(86) PCT No.: PCT/EP2017/067684

§ 371 (c)(1),
(2) Date: Feb. 8, 2019

(87) PCT Pub. No.: WO2018/028922

PCT Pub. Date: Feb. 15, 2018

(65) Prior Publication Data

US 2020/0181349 A1 Jun. 11, 2020

(30) Foreign Application Priority Data

Aug. 11, 2016 (EP) .................................... 16183813

(51) Int. Cl.
*C08J 9/00* (2006.01)
*C08J 3/12* (2006.01)
*C08J 3/28* (2006.01)

(52) U.S. Cl.
CPC ............... *C08J 9/0095* (2013.01); *C08J 3/12* (2013.01); *C08J 3/28* (2013.01); *C08J 9/0066* (2013.01); *C08J 2201/026* (2013.01); *C08J 2201/03* (2013.01); *C08J 2205/052* (2013.01); *C08J 2323/12* (2013.01)

(58) Field of Classification Search
CPC ........ C08J 9/0095; C08J 9/141; C08J 9/0023; C08J 9/0006; C08J 3/12; C08J 3/28; C08J 2201/026; C08J 2201/03; C08J 2205/052; C08J 2323/12; C08J 2203/14; C08L 2203/14; C08K 5/005; C08K 5/1545
USPC ................................................ 522/157, 150
See application file for complete search history.

(56) References Cited

U.S. PATENT DOCUMENTS 4,916,198 A * 4/1990 Scheve ................. C08F 110/06 522/129
5,414,027 A 5/1995 Denicola, Jr. et al.
8,399,536 B2 3/2013 Abata et al.
2004/0156879 A1* 8/2004 Muratoglu ............ B29C 43/003 424/423
2018/0051160 A1* 2/2018 Pehlert .................... C08L 23/16

OTHER PUBLICATIONS

Al-Malaika et al.; "The antioxidant role of a-tocopherol in polymers II. Melt stabilising effect in polypropylene", Polymer Degradation and Stability, Barking, GB, vol. 64, No. 1, Apr. 1, 1999, pp. 145-156.
Borsig et al.; "Long chain branching on linear polypropylene by solid state reactions"; European Polymer Journal 44 (2008) pp. 200-212.
Fang et al.: "Properties of Blends of Linear and Branched Polypropylenes in Film Blowing"; The Canadian Journal of Chemical Engineering, vol. 86, Feb. 2008, pp. 7-14.
Gahleitner, "Melt Rheology of Polyolefins"; Progress in Polymer Science, vol. 26 (2001) pp. 895-944.
International Search Report for International Application No. PCT/EP2017/067684, International Filing Date Jul. 13, 2017, dated Aug. 2, 2017, 5 pages.
Ratzsch et al. "Polypropylene Foams" Polpropylene: An A-Z Reference, Kluwer Publishers, Springer, 1999, pp. 635-642.
Stange et al.;"Effect of Long-chain Branching on the Foaming of Polypropylene with Azodicarbonamide" Journal of Cellular Plastics, vol. 42, Nov. 2006, pp. 2-25.
Written Opinion for International Application No. PCT/EP2017/067684, International Filing Date Jul. 13, 2017, dated Aug. 2, 2017, 6 pages.
Zimm et al. "The Dimensions of Chain Molecules Containing Branches and Rings" The Journal of Chemical Physics, vol. 17, 1301 (1949) 15 pages.
Gorelik et al., "Effect of Oxygen on the Degradation of Polypropylene Initiated by Ionizing Irradation, " 1993, Polymer Degradation and Stability, vol 42, pp. 263-266.

* cited by examiner

*Primary Examiner* — Sanza L. McClendon
(74) *Attorney, Agent, or Firm* — Cantor Colburn LLP

(57) ABSTRACT

The invention relates to a process to produce irradiated polypropylene granulate wherein granulate comprising 1. a propylene polymer and 2. a vitamin E comprising stabilizer package is irradiated by electron beam radiation.

14 Claims, No Drawings

POLYPROPYLENE COMPOSITION

CROSS REFERENCE TO RELATED APPLICATIONS

This application is a 371 of International Application No. PCT/EP2017/067684, filed Jul. 13, 2017, which is incorporated herein by reference in its entirety, and which claims priority to EP Application No. 16183813.1, filed Aug. 11, 2016.

The present invention relates to a process to produce irradiated polypropylene compositions.

The invention also relates to foam structures produced using these propylene-based polymer compositions.

In case propylene-based polymer compositions are applied to form shaped objects, it is necessary that the compositions have a sufficiently high melt strength to be able to mould the compositions into the desired shape. This is for example the case when propylene-based polymer compositions are shaped into objects via processes in which the composition is heated to above its melt temperature and subsequently shaped into the desired objects. In such process, a high shape stability is required of the propylene-based polymer composition at that temperature at which the object is shaped. The propylene-based polymer composition needs to be able to maintain its shape in the molten situation under such temperature conditions prior to solidification by cooling taking place.

Such objects to be prepared using propylene-based polymer compositions may for example include foam structures. A common method for the production of foam structures using propylene-based polymer compositions, as described in 'Polypropylene foams', Rätzsch et al., Springer, 1999, DOI: 10.1007/978-94-011-4421-6-86, p. 635-642, is a process comprising the steps of:

(i) bringing the propylene-based polymer composition in a molten condition;
(ii) introducing pockets of gaseous material into the molten propylene-based polymer composition to form a molten propylene-based polymer composition comprising foam cells;
(iii) moulding the molten propylene-based polymer composition comprising foam cells into the desired shape comprising a foam structure; and
(iv) solidifying the shaped foam structure by cooling to below the melting point of the propylene-based polymer composition.

Generally, these steps are conducted in the presented order.

A critical element in this process is the formation of the foam cells in step (ii). Depending on the nature of the processed material, the foam structure may comprise a certain quantity of closed cells. In the context of the present invention, closed cells may be understood to be pockets of gaseous material that are on all sides surrounded by closed cells walls, such that the gaseous material in each cell is not in contact with the gaseous material in another cell. Such cell walls may for example comprise the propylene-based polymer composition.

For certain applications, it is desirable that the foam structure comprises a certain high fraction of closed cells. A high fraction of closed cells may contribute to the thermal insulation value of a foamed structure. Furthermore, a high fraction of closed cells may contribute to the strength of a foamed structure such as in terms of flexural modulus and tensile strength.

Furthermore, it is desirable that these foam structures have a certain low density. For example, the density of the foam structures may be ≤175 kg/m$^3$, alternatively ≤150 kg/m$^3$. Foam structures having such low density comply with requirements of weight for applications such as construction panels for temporary shelters.

Another important characteristic is that the temperature range in which foam structures having such desired high fraction of closed cells and having such desired low density may be produced by extrusion foam production methods is sufficiently broad. This temperature range is also referred to as the foamability window. Preferably, the foamability window is ≥10° C. If the foamability window is too narrow, this presents a significant burden on the foam processing equipment, as fluctuations in processing temperature need to be avoided. Fluctuations beyond the foamability window of a material to be foamed may lead to off-spec material which is unsuitable to be sold commercially for reasons of not meeting the quality requirements.

In order to achieve the above properties, the propylene-based polymer composition needs to have a sufficiently high melt strength. The melt strength presents an indication of the extent to which the individual polymeric molecules manage to maintain their positions towards each other under conditions where the polymer composition is in a molten state.

There is an ongoing need to develop a method for improving the melt strength of propylene-based polymer compositions.

The invention is directed to a process to produce irradiated polypropylene granulate. The process is characterised in that granulate comprising 1. propylene polymer and
2. vitamin E comprising stabilizer package is irradiated by electron beam radiation to form irradiated polypropylene granulate.

According to a preferred embodiment of the invention the irradiated polypropylene granulate has

- a strain hardening coefficient as determined via extensional viscosity measurement at a temperature of 170° C. at a strain elongation rate of 1.0 s$^{-1}$ measured at 2.75 s of ≥8.0, more preferably ≥10.0;
- a zero shear viscosity as determined using DMS with fit according to the Cross-model of ≥7000 Pa·s, more preferably ≥10000 Pa·s; and
- degree of shear thinning defined as the ratio of complex viscosity η* at a frequency of 10 rad/s:complex viscosity at a frequency of 0.01 rad/s ($\eta_{0.01}$) of ≤0.15, more preferably ≤0.10, wherein the complex viscosity is determined via DMS
- wherein for determining the DMS spectrum, an ARES G2 rheometer was used at 200° C. measuring at frequencies of 0.01 rad/s to 100 rad/s, at a linear viscoelastic strain of 5%, using plates of 0.5 mm thickness produced according to ISO 1872-2 (2007).

The strain hardening coefficient is an indicator for melt strength.

According to a preferred embodiment of the invention the strain hardening coefficient as determined via extensional viscosity measurement at a temperature of 170° C. at a strain elongation rate of 1.0 s$^{-1}$ measured at 2.75 s is ≥10.0.

According to a preferred embodiment of the invention the zero shear viscosity as determined using DMS with fit according to the Cross-model is ≥10000 Pa·s.

According to a preferred embodiment of the invention the degree of shear thinning defined as the ratio of complex viscosity η* at a frequency of 10 rad/s:complex viscosity at a frequency of 0.01 rad/s ($\eta_{0.01}$) is ≤0.10.

The irradiated polypropylene granulate is produced by mixing, for example by melt blending, by dry blending or by extruding, the polymer and the vitamin E comprising stabilizer package to obtain an intermediate polypropylene resin. Next the intermediate polypropylene is irradiated by electron beam radiation to form an irradiated polypropylene granulate.

The irradiated granulate according to the invention shows a relatively low yellowness increase.

The propylene polymer applied in the present invention may be a homopolymer or a copolymer.

Polypropylene compositions consisting of a propylene homopolymer or a propylene copolymer are known. A propylene homopolymer is obtained by polymerizing propylene under suitable polymerization conditions. A propylene copolymer is obtained by copolymerizing propylene and one or more other olefins, preferably ethylene, under suitable polymerization conditions. The preparation of propylene homopolymers and copolymers is, for example, described in Moore, E. P. (1996) Polypropylene Handbook. Polymerization, Characterization, Properties, Processing, Applications, Hanser Publishers: New York.

With polypropylene as used herein is meant propylene homopolymer or a copolymer of propylene with an α-olefin, for example an α-olefin chosen from the group of α-olefin having 2 or 4 to 10 C-atoms, for example wherein the amount of α-olefin is less than 10 wt % based on the total propylene copolymer.

Polypropylene and a copolymer of propylene with an α-olefin can be made by any known polymerization technique as well as with any known polymerization catalyst system. Regarding the techniques, reference can be given to slurry, solution or gas phase polymerizations; regarding the catalyst system reference can be given to Ziegler-Natta, metallocene or single-site catalyst systems.

According to a preferred embodiment of the present invention propylene is propylene homopolymer.

Preferably the degree of crystallinity of the polypropylene is at least 35%, for example at least 40% and for example at most 80%, for example at most 75% as determined using Differential Scanning calorimetry according to ASTM D 3418-08 using a scan rate of 10° C./min on a sample of 10 mg and using the second heating cycle.

For example, the degree of crystallinity of the polypropylene is in the range from 30 to 55%, for example in the range from 35 to 50% as determined using Differential Scanning calorimetry according to ASTM D 3418-08 using a scan rate of 10° C./min on a sample of 10 mg and using the second heating cycle.

The degree of branching from the polypropylene is preferably low, for example the branching index g' is at least 0.95, preferably at least 0.96, for example at least 0.97, for example at least 0.98, for example at least 0.99, for example 1.00.

The branching index g' defines the degree or branching and correlates with the amount of branches of a polymer. The branching index g' is defined as $g'=[IV]_{br}/[IV]_{lin}$ in which g' is the branching index, $[IV]_{br}$ is the intrinsic viscosity of the branched polypropylene and $[IV]_{lin}$ is the intrinsic viscosity of the linear polypropylene having the same average molecular weight (within a range of ±3%) as the branched polypropylene. Thereby, a low g'-value is an indicator for a highly branched polymer. In other words, if the g'-value decreases, the branching of the polypropylene increases (B. H. Zimm and W. H. Stockmeyer, J. Chem. Phys. 17, 1301 (1949)).

The intrinsic viscosity needed for determining the branching index g' is measured according to DIN ISO 1628/1, October 1999 (in decalin at 135° C.).

Alternatively, the branching of the polypropylene may be measured using $^{13}C$ NMR. Preferably the amount of branching in the polypropylene is low, for example the amount of branching in the polypropylene is in the range from 0 to 10 branches/1000 carbon atoms, for example in the range from 0 to 5 branches/1000 carbon atoms for example in the range from 1 to 5 branches/1000 carbon atoms. Preferably, the melt mass flow rate of the polypropylene as determined using ASTM D1238-10 (230° C./2.16 kg) ranges from 0.1-100 g/10 min. Preferably, the melt mass flow rate of the polypropylene ranges from 1 to 100 g/10 min, more preferably from 2 to 25 g/10 min.

Preferably the amount of vitamin E in the composition of polypropylene and Vitamin E is lower than 0.5 wt % relative to the amount of polypropylene.

More preferably the amount of vitamin E in the composition of polypropylene and Vitamin E of lower than 0.1 wt %.

Most preferably the amount of vitamin E in the composition of polypropylene and Vitamin E ranges between 0.025 and 0.05 wt %.

Preferably vitamin E is α-tocopherol.

According to the present invention the α-tocopherol is preferably synthetic α-tocopherol.

A suitable example of α-tocopherol and/or synthetic α-tocopherol to be applied in the present invention may be is Irganox E 201 (supplied by BASF) which is a racemic mixture of equal amounts of all eight possible stereoisomers of α-tocopherol (RRR, SSS, RRS, RSR, SSR, SRS, SRR, RSS) and is referred to as dl-α-tocopherol or all-rac-alpha-tocopherol.

The use of α-tocopherol may for example allow to achieve efficient stabilization with relatively low loadings of α-tocopherol.

The stabilized polyolefin composition may preferably not comprise other tocopherols and/or no tocotrienol and/or no natural vitamin E and/or no other antioxidant and/or no other compound comprising at least one phenolic motif.

The granulate according to the invention may also comprise other additives for example an organometallic stearate such as for example magnesium stearate, aluminium stearate, sodium stearate and calcium stearate and/or at least one inorganic hydrotalcites, such as for example DHT4A, preferably calcium stearate. An organometallic stearate and/or an inorganic hydrotalcite may improve processability. The amount of this component may range for example between 100 ppm and 1000 ppm by weight, more preferably between 200 ppm and 800 ppm by weight, further preferred between 400 ppm and 600 ppm by weight, relative to the polypropylene.

The irradiated polypropylene compositions are produced by mixing, for example by melt blending, by dry blending or by extruding, the polymer and the vitamin E comprising stabilizer package to obtain an intermediate polypropylene resin. Next the intermediate polypropylene resin is irradiating by electron beam radiation to form an irradiated polypropylene resin.

The intermediate polypropylene resin may be irradiated in an inert or in a non-inert environment.

The dose applied in electron beam irradiation may range between 10 and 200 KGy (1 Megarad and 20 Megarad), preferably between 20 KGy and 150 KGy.

It is for example possible to use a reduced oxygen environment as described for example in U.S. Pat. No.

8,399,536, wherein active oxygen is in an established and maintained concentration of less than about 15% by volume, with respect to a total volume of the reduced oxygen environment. In this process the intermediate irradiated polypropylene resin is maintained in the reduced oxygen environment for a period of time sufficient for a significant amount of long chain branches to form within the intermediate irradiated polypropylene resin and the intermediate irradiated polypropylene resin is treated while the intermediate irradiated polypropylene resin is in the reduced oxygen environment to substantially deactivate all free radicals present in the intermediate irradiated polypropylene resin.

The present invention also relates to foamed objects or articles which are produced using the irradiated polypropylene granulate according to the present invention.

The propylene-based polymer composition according to the invention may be formed into foam structures by a melt processing step. Such melt processing step may be performed in a second melt extruder. A blowing agent may be added to the melt processing to induce the formation of foam cells. Such blowing agent may be a chemical blowing agent or a physical blowing agent.

The chemical blowing agent may for example be selected from sodium hydrogen carbonate, citric acid derivatives, azodicarbonamide, hydrazo dicarbonamide, 4,4'-oxybis (benzenesulfonyl hydrazide), N, N-dinitroso pentamethylene tetramine, 5-phenyltetrazole, p-Toluene sulfonyl hydrazide, and/or p-toluene sulphonyl semicarbazide.

The physical blowing agent may for example be selected from nitrogen, carbon dioxide, isobutane, pentane and cyclopentane. Preferably, the blowing agent is isobutane.

The blowing agent may be introduced into the melt extruder at a location where the propylene-based polymer composition according to the invention is in a molten state. For example, the blowing agent may be introduced in quantities of ≥1.0 and ≤20.0 wt % with regard to the weight of the propylene-based polymer composition, alternatively a ≥1.5 and ≤10.0 wt %, alternatively ≥2.0 and ≤5.0 wt %. The introduction of such quantities of blowing agent may contribute to the formation of a foamed structure having a desired low density in combination with a desired high fraction of closed cells. It is preferred that ≥2.0 and ≤10.0 wt %, even more preferred ≥2.0 and ≤5.0 wt % of isobutane with regard to the weight of the propylene-based polymer composition is used as blowing agent.

In addition, further commonly known additives suitable for the production of foam structures from propylene-based polymer compositions may be used.

For example, a quantity of a nucleating agent such as talc and/or fatty acid (bis)amides may be added. Preferably, talc is used as nucleating agent. For example, the nucleating agent may be added in quantities of 0.1 to 2.0 wt % such as 0.5 to 1.5 wt % with regard to the weight of the propylene-based polymer composition.

Also, a quantity of a cell stabiliser such as glycerol monostearate (GMS), glycerol monopalmitate (GMP), glycol di-stearate (GDS), palmitides and/or amides for example stearyl stearamide, palmitamide and/or stearamide may be added. Preferably, glycerol monostearate is used as cell stabiliser. For example, this cell stabiliser may be added in quantities of 0.1 to 2.0 wt % such as 0.5 to 1.5 wt % with regard to the weight of the propylene-based polymer composition.

The propylene-based polymer composition may subsequently be extruded from a die outlet of the second melt extruder. The foam structure may thus be formed.

Different material properties of the propylene-based polymer composition according to the invention and of the foam structures produced using this composition have been determined via the methods described here.

The present invention also relates to foam produced with the propylene polymer and Vitamin E based granulate obtained with the irradiation process according to the invention.

The density of the foam structures ranges between 20 and 800 kg/m$^3$.

The density of the foam structures was determined as the apparent overall density according to ISO 845 (2006).

The fraction of closed cells is preferably ≥90%. More preferably the fraction of closed cells ≥98%, more preferably ≥98%.

The fraction of closed cells was determined by placing a sample of the foam having a known mass $M_A$ and a known density $\rho_{foam}$ as determined as the apparent overall density according to ISO 845 (2006) in a desiccator. The samples each had a length of 5 cm and a width of 3 cm. The desiccator was filled with water and a polyethylene glycol as surfactant. The pressure in the desiccator was reduced to 500 mbar. The samples were kept under these conditions for 10 min, following which the samples were removed and placed in methanol for 2 sec. All materials were used at room temperature (23° C.). Subsequently, the samples were placed in an oven at 60° C. for 5 min, following which the mass $M_B$ of the sample was determined. With this, the fraction of closed cells was determined according to the formula:

$$\text{Fraction closed cells} = \left(1 - \frac{\rho_{water}(M_B - M_A)}{\rho_{foam} * M_A}\right) * 100\%$$

wherein $\rho_{water}$ is the density of water, set at 1000 kg/m$^3$. $M_B$-$M_A$ is the mass of the absorbed quantity of water in the desiccator. Accordingly, the fraction closed cells is the fraction of cells the volume of which has not been filled with water.

The foamability window was determined as the temperature range of the foam extrusion in which foam structures having a density of ≤200 kg/m$^3$ and a fraction closed cells of >98% can be prepared using 2.3 wt % isobutane with regard to the weight of the propylene-based polymer composition as blowing agent. This temperature range was determined by operating the foam extruder under such conditions that the temperature of the polymer melt in the area before the die (the die melt temperature) was varied starting at 175° C. and then stepwise reduced by 2-3° C. Foam samples were collected that were prepared at each set die melt temperature, and the foam density and the fraction closed cells was measured for each sample.

A further embodiment of the invention relates to the production of foamed objects via a melt extrusion foaming process using a propylene-based composition produced according to the process of the invention, wherein the foamability window is 10° C., the foamability window being defined as the temperature range where foams may be produced having an apparent overall density of ≤175 kg/m$^3$ as determined according to ISO 845 (2006) and a closed cell content of ≥98% when using 2.3 wt % of isobutane as blowing agent. The invention also relates to a foamed object produced using a propylene-based composition produced according to the process of the present invention wherein the foamed object has an apparent overall density ≤175 kg/m$^3$ as determined according to ISO 845 (2006) and a closed cell content of a ≥98%.

The polypropylene composition according to the invention may contain additives, for instance nucleating agents and clarifiers, stabilizers, release agents, fillers, peroxides, plasticizers, anti-oxidants, lubricants, antistatics, cross linking agents, scratch resistance agents, high performance fillers, pigments and/or colorants, impact modifiers, flame retardants, blowing agents, acid scavengers, recycling additives, coupling agents, anti-microbials, anti-fogging additives, slip additives, anti-blocking additives, polymer processing aids and the like. Such additives are well known in the art. The skilled person will choose the type and amount of additives such that they do not detrimentally influence the aimed properties of the composition.

U.S. Pat. No. 4,916,198 discloses the radiation of polypropylene powder and the addition of additives after irradiation. U.S. Pat. No. 4,916,198 does not disclose polypropylene granulate and U.S. Pat. No. 4,916,198 does not disclose the use of Vitamin E. U.S. Pat. No. 4,916,198 does not disclose a process wherein granulate comprising propylene polymer and vitamin E comprising stabilizer package is irradiated by electron beam radiation.

U.S. Pat. No. 5,414,027 discloses electron beam irradiation of propylene polymer. U.S. Pat. No. 5,414,027 does not disclose the use of Vitamin E as stabilizer.

The publication "The antioxidant role of alpha tocopherol in polymers" (Polymer degradation and stability 64 (1999) 145-156 is directed to the stabilizing effect of alpha tocopherol during melt extrusion of polypropylene. This publication does not refer to electron beam irradiation.

The invention will now be illustrated by the following non-limiting examples.

EXAMPLE I

Irradiated Polypropylene Granulate 99.925% by weight of polypropylene (PP) homopolymer with a MFI=0.3 dg/10 min (12; ISO 1133) was compounded on a Berstorf ZE25A-43D where the additives (0.05% by weight calcium stearate and 0.025% by weight Vitamin E) were dosed under nitrogen to the powder. The throughput was 16.1 kg/h. The additives were dosed via a pre-blend or direct dosing to the extruder. The temperature setting of the extruder was between 20° C. and 240° C. The obtained granulate was irradiated by an E Beam process. The E Beam radiation process was performed in three steps:

Radiation of granulate with a dose of 100 kGy.

Heating of the radiated granulate for 30 minutes at 60° C.

De-activating the radicals by heating 30 minute at 140° C.

EXAMPLE II

Foaming Irradiated Polypropylene Granulate

A foam composition using the irradiated polypropylene resin obtained in Example I was produced by a procedure wherein the polypropylenes were fed together with 1.0 wt % by weight with regard to the weight of the polypropylene of Schulman PHBFPE50T (a 50% by weight masterbatch of talc in LDPE and 1.0 wt % by weight of glycerol monostearate (CAS registry nr. 31566-31-1)) to a co-rotating ZSK 30 twin screw melt extruder having an LID ratio of 40, equipped with a Aixfotec melt cooler and an annular foam die. The extruder was operated at a throughput of 10 kg/h, and the die pressure was maintained at 30 bar. In the extruder, the polypropylene was heated to 260° C. at which the material was in a molten condition. A quantity of isobutane as blowing agent to produce the foam was introduced into the melt in the extruder via an inlet positioned at zone 7 of the extruder. The quantity of isobutane used was 2.3 wt % with regard to the weight of the polypropylene. By further melt mixing of the material composition comprising the molten polypropylene and the blowing agent, a molten foamed material was obtained having a uniform foam cell distribution. In the Aixfotec melt cooler, the melt was cooled to temperatures of 175° C. in the area before the die. The molten foamed material forced out of the extruder via the annular die and cooled to form a solidified foam structures. The temperature in the area of the die was reduced stepwise from 175° C. down to 160° C. in steps of 2-3° C. At each temperature, foamed material was collected from which the density and the closed cell content were measured in order to determine the foamability window.

Determination of Properties

The melt mass-flow rate, the strain hardening and the viscosity ratio were determined. The foamability window, the foam density of foam prepared at 162° C. and the quantity of closed cells of foam prepared at 162° C. were determined. The results are presented in Table I.

TABLE I

| | |
|---|---|
| FW | 20 |
| CC | >99% |
| FD | 125° C. |
| $MFR_{2.16}$ | 3 |
| $SH_{1.0}$ | 40 |
| $\eta_{0.1}$ | 5592 |
| $\eta_1$ | 2329 |
| $\eta_{10}$ | 877 |
| $\eta_{100}$ | 288 |
| $\eta_0$ | 19045 |

In which:

FW is the foamability window (° C.) as determined via the method described above;

CC is fraction of closed cells as determined by the above described water absorption method of the foam as produced at 162° C. (%);

FD is the density of the foam as produced at 162° C., determined as the apparent overall density according to ISO 845 (2006) (kg/m$^3$);

$MFR_{2.16}$ is the melt mass-flow rate as determined in accordance with ISO 1133-1 (2011), at a temperature of 230° C. and a load of 2.16 kg (g/10 min);

$SH_{1.0}$ is the strain hardening coefficient as determined according to the method described above (–). For determining the strain hardening coefficient, an ARES G2 rheometer equipped with an EVF (extensional viscosity fixture) was used at 170° C.

$\eta_0$ is the zero shear viscosity as determined using DMS (Pa·s) where viscosity data are fit using the Cross-model.

$\eta_{0.1}$ is shear viscosity at an angular frequency of 0.1 rad/sec $\eta_1$ is shear viscosity at an angular frequency of 1 rad/sec $\eta_{10}$ is shear viscosity at an angular frequency of 10 rad/sec $\eta_{100}$ is shear viscosity at an angular frequency of 100 rad/sec For determining the DMS spectrum, an ARES G2 rheometer was used at 200° C. measuring at frequencies of 0.01 rad/s to 100 rad/s, at a linear viscoelastic strain of 5%, using plates of 0.5 mm thickness produced according to ISO 1872-2 (2007). The melt mass-flow rate of the modified polypropylene obtained with radiation was determined according to ISO 1133-1 (2011). ISO 1133-1 (2011) relates to determination of the melt mass-flow rate (MFR) and melt volume-flow rate (MVR) of thermoplastics. The melt mass-flow rate was determined at 230'C at a load of 2.16 kg.

Granulate comprising PP and vitamin E can be irradiated and the irradiated product is suitable to be foamed, Vitamin E enhances the melt strength of the polypropylene based composition.

EXAMPLE III AND COMPARATIVE EXAMPLES A-C

Example I is repeated with use of the components as summarized in Table Z

TABLE II

| Example | | A | B | C | III |
|---|---|---|---|---|---|
| polypropylene | % by weight | 99.8 | 99.1 | 99.95 | 99.925 |
| Irgafos 168 | % by weight | 0.05 | — | — | — |
| Irganox 1010 | % by weight | 0.1 | 0.05 | — | — |
| Vitamin E | % by weight | — | — | — | 0.025 |
| Calcium Stearate | % by weight | 0.05 | 0.05 | 0.05 | 0.05 |
| $MFR_{2.16}$ before irradiation | dg/min | 0.6 | 1 | 1.6 | 0.6 |
| $MFR_{2.16}$ after irradiation | dg/min | 16.3 | 19 | 15.5 | 3 |
| Melt strength after irradiation | cN | 3 | 19 | 30 | 40 |

The table shows that $MFR_{2.16}$ of III is stable in contrast to A-C $MER_{2.16}$ show that the product is degraded after irradiation.

The melt strength of III is strongly improved when compared with A-C.

The melt strength is determined with Rheatens® setup wherein the capillary radius was 1 mm and the entrance angle was 90° C. The pinching point of the rollers was at a vertical distance of 10 cm from the die exit. A weight of 10 kg was used to push the melt through the capillary.

The invention claimed is:

1. A process to produce irradiated polypropylene granulate characterised in that granulate comprising:

1. propylene polymer, and
2. vitamin E comprising stabilizer package, is irradiated by electron beam irradiation.

2. The process according to claim 1, wherein the irradiated polypropylene granulate has a strain hardening coefficient as determined via extensional viscosity measurement at a temperature of 170° C. at a strain elongation rate of 1.0 $s^{-1}$ measured at 2.75 s of ≥8.0;

a zero shear viscosity as determined using DMS with fit according to the Cross-model of ≥7000 Pa·s; and degree of shear thinning defined as the ratio of complex viscosity $\eta^*$ at a frequency of 10 rad/s:complex viscosity at a frequency of 0.01 rad/s ($\eta_{0.01}$) of ≤0.15, wherein the complex viscosity is determined via DMS wherein for determining the DMS spectrum, an ARES G2 rheometer was used at 200° C. measuring at frequencies of 0.01 rad/s to 100 rad/s, at a linear viscoelastic strain of 5%, using plates of 0.5 mm thickness produced according to ISO 1872-2 (2007).

3. The process according to claim 1, wherein the amount of vitamin E in the composition of polypropylene and Vitamin E is lower than 0.5 wt % relative to the amount of polypropylene.

4. The process according to claim 1, wherein Vitamin E is α-tocopherol.

5. The process according to claim 1, wherein the dose applied in electron beam irradiation ranges between 10 and 200 KGy.

6. A foamed object obtained with irradiated polypropylene granulate obtained with the process according to claim 1.

7. The process according to claim 2, wherein the amount of vitamin E in the composition of polypropylene and Vitamin E is lower than 0.5 wt % relative to the amount of polypropylene, and wherein Vitamin E is α-tocopherol.

8. The process according to claim 7, wherein the dose applied in electron beam irradiation ranges between 10 and 200 KGy.

9. The process according to claim 2, wherein the amount of vitamin E in the composition of polypropylene and Vitamin E is lower than 0.5 wt % relative to the amount of polypropylene, and wherein the dose applied in electron beam irradiation ranges between 10 and 200 KGy.

10. The process according to claim 2, wherein Vitamin E is α-tocopherol, and wherein the dose applied in electron beam irradiation ranges between 10 and 200 KGy.

11. The process according to claim 1, wherein the amount of vitamin E in the composition of polypropylene and Vitamin E is lower than 0.5 wt % relative to the amount of polypropylene, and wherein Vitamin E is α-tocopherol.

12. The process according to claim 11, wherein the dose applied in electron beam irradiation ranges between 10 and 200 KGy.

13. The process according to claim 1, wherein the amount of vitamin E in the composition of polypropylene and Vitamin E is lower than 0.5 wt % relative to the amount of polypropylene, and wherein the dose applied in electron beam irradiation ranges between 10 and 200 KGy.

14. The process according to claim 1, wherein Vitamin E is α-tocopherol, and wherein the dose applied in electron beam irradiation ranges between 10 and 200 KGy.

* * * * *